United States Patent
Huang et al.

(10) Patent No.: US 9,778,988 B2
(45) Date of Patent: Oct. 3, 2017

(54) POWER FAILURE DETECTION SYSTEM AND METHOD

(71) Applicants: Inventec (Pudong) Technology Corporation, Shanghai (CN); INVENTEC CORPORATION, Taipei (TW)

(72) Inventors: Jian-Xin Huang, Shanghai (CN); Ying-Xian Han, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 15 days.

(21) Appl. No.: 14/931,824

(22) Filed: Nov. 3, 2015

(65) Prior Publication Data
US 2017/0010938 A1    Jan. 12, 2017

(30) Foreign Application Priority Data
Jul. 10, 2015   (CN) .......................... 2015 1 0405799

(51) Int. Cl.
*G06F 11/00*    (2006.01)
*G06F 11/14*    (2006.01)
(Continued)

(52) U.S. Cl.
CPC ............ *G06F 11/1417* (2013.01); *G06F 1/28* (2013.01); *G06F 1/30* (2013.01); *G06F 2201/805* (2013.01); *G06F 2201/85* (2013.01)

(58) Field of Classification Search
CPC .......... G06F 11/1417; G06F 1/28; G06F 1/30; G06F 2201/85; G06F 2201/805
(Continued)

(56) References Cited

U.S. PATENT DOCUMENTS 4,562,550 A * 12/1985 Beatty ................ H02J 13/0086
                                                       307/39
4,763,333 A *  8/1988 Byrd ........................ G06F 1/30
                                                       365/228
(Continued)

FOREIGN PATENT DOCUMENTS

TW          I458995 B     11/2014
TW          I480726 B      4/2015
WO       2015047404 A1     4/2015

OTHER PUBLICATIONS

Definition of motherboard, retrieved from wikipedia of date Jul. 7, 2015 using way back machine. retrieved from http://web.archive.org/web/20150707100937/https://en.wikipedia.org/wiki/Motherboard.*

(Continued)

*Primary Examiner* — Yair Leibovich
(74) *Attorney, Agent, or Firm* — CKC & Partners Co., Ltd.

(57) ABSTRACT

A power failure monitoring system and a method are disclosed herein, where the power failure monitoring system includes a motherboard, a board, a complex programmable logic device (CPLD) and a baseboard management controller (BMC) module. The motherboard includes a central processing unit (CPU) power and a non-CPU power. The board includes a board power. The BMC module includes a register that is electrically coupled to the CPLD. The CPLD is configured to execute a shutdown process when power failure occurs, identify a power failure type, and determine whether to execute a restart process according to the power failure type. If the restart process is executed and a count of the restart process reaches a predetermined count, the CPLD records lock information in the register. The BMC module is configured to record the count of the restart process, and execute a lock process according to the lock information.

10 Claims, 2 Drawing Sheets

(51) Int. Cl.
*G06F 1/28* (2006.01)
*G06F 1/30* (2006.01)

(58) Field of Classification Search
USPC .......................................................... 714/15
See application file for complete search history.

(56) References Cited

U.S. PATENT DOCUMENTS

| | | | | | |
|---|---|---|---|---|---|
| 5,189,598 | A | * | 2/1993 | Bolan | G06F 1/183 |
| | | | | | 174/250 |
| 5,630,142 | A | * | 5/1997 | Crump | G06F 1/3203 |
| | | | | | 713/323 |
| 5,758,174 | A | * | 5/1998 | Crump | G06F 1/3203 |
| | | | | | 712/E9.032 |
| 5,878,264 | A | * | 3/1999 | Ebrahim | G06F 1/3203 |
| | | | | | 713/323 |
| 6,694,452 | B1 | * | 2/2004 | Kitao | G06F 1/24 |
| | | | | | 714/10 |
| 2012/0047404 | A1 | * | 2/2012 | Peng | G06F 1/28 |
| | | | | | 714/48 |
| 2012/0166715 | A1 | * | 6/2012 | Frost | G06F 11/1068 |
| | | | | | 711/103 |
| 2015/0012151 | A1 | * | 1/2015 | Park | G05B 15/02 |
| | | | | | 700/298 |

OTHER PUBLICATIONS

Definition of Intelligent_Platform_Management_Interface, retrieved from wikipedia of date Jun. 9, 2015 using way back machine. retrieved from http://web.archive.org/web/20150609131023/https://en.wikipedia.org/wiki/Intelligent_Platform_Management_Interface.*

* cited by examiner

POWER FAILURE DETECTION SYSTEM AND METHOD

RELATED APPLICATIONS

This application claims priority to Chinese Application Serial Number 201510405799.7, filed Jul. 10, 2015, which is herein incorporated by reference.

BACKGROUND

Field of Invention

The present invention relates to a detection technology. More particularly, the present invention relates to a power failure detection system and method.

Description of Related Art

When problems of internal powers, such as incapability of power on, power down after starting up, power down after a switch button is pressed and fans operate, happen in a server, an oscilloscope or a multimeter is typically used to measure related signals like a power good signal and an enable signal of a power-on sequence to determine from which of the internal powers the problems of incapable of booting up result.

On the other hand, after servers are mounted in a chassis to form a system, if the above problems happen, it is difficult to use the oscilloscope or the multimeter to measure the power-on sequence. Therefore, it is unable to promptly determine which of the powers result in the power problems, or whether the power problem is a false power fault that, for example, from other system configurations.

SUMMARY

In order to recognize power problems that occur in a server system and immediately handle incapability of starting up resulted from a false power fault, an aspect of the present disclosure provides a power failure detection system. The power failure detection system includes a motherboard, a board, a complex programmable logic device (CPLD) and a baseboard management controller (BMC) module. The motherboard includes a central processing unit (CPU) power and a non-CPU power. The board includes a board power. The BMC module includes a register that is electrically coupled to the CPLD. The CPLD is configured to execute a shutdown process when a power failure occurs, identify a power failure type, and determine whether to execute a restart process according to the power failure type. If the restart process is executed and a count of the restart process reaches a predetermined count, the CPLD records a lock information in the register. The power failure type indicates that the power failure occurs on the CPU power, the non-CPU power or the board power. The BMC module is configured to record the count of the restart process, and execute a lock process according to the lock information.

In an embodiment of the present disclosure, when the CPLD records the lock information in the register, the CPLD sends a position information of the register to the baseboard management controller module; the baseboard management controller module reads the lock information in the register according to the position information.

In an embodiment of the present disclosure, when the power failure type indicates that the power failure occurs on the central processing unit power, the complex programmable logic device records the lock information in the register.

In an embodiment of the present disclosure, when the power failure type indicates that the power failure occurs on the board power or the non-central processing unit power, the complex programmable logic device executes the restart process.

In an embodiment of the present disclosure, the complex programmable logic device is configured to record that the power failure occurs on a power failure position inside the central processing unit power, the non-central processing unit power or the board power through a power scanning process.

Another aspect of the present disclosure provides a power failure detection method including the following steps. When a power failure occurs, a shutdown process is executed. A power failure type is recognized and whether to execute a restart process according to the power failure type is determined. The power failure type indicates that the power failure occurs on a central processing unit power, a non-central processing unit power or a board power. If the restart process executed and a count of the restart process reaches a predetermined count, a lock information is recorded in the register, and, by a baseboard management controller module, the count of the restart process is recorded. A lock process is executed according to the lock information by the baseboard management controller module.

In an embodiment of the present disclosure, when the lock information is recorded in the register, a position information of the register is sent to the baseboard management controller module. The baseboard management controller module reads the lock information in the register according to the position information.

In an embodiment of the present disclosure, when the power failure type indicates that the power failure occurs on the central processing unit power, the lock information is recorded in the register.

In an embodiment of the present disclosure, when the power failure type indicates that the power failure occurs on the board power or the non-central processing unit power, the restart process is executed.

In an embodiment of the present disclosure, a power failure position where the power failure occurs inside the central processing unit power, the non-central processing unit power or the board power is recorded through a power scanning process.

In sum, with the present disclosure, a power in a server system where a power failure occurs can be recognized without measuring power-on sequence of powers in turn. A correspondingly subsequent process is executed according to the aforementioned power failure type to solve false power fault event, i.e., a true power failure can be checked. Repair cost resulted from the false power fault can be further reduced. In the other hand, if the power failure cannot be solved through the restart process, failure analysis and breakdown repair process of the power failure in the server system can be improved by related information of the power failure.

The following is detailed description of the aforementioned contents through embodiments, and provides further explanation of the technical aspects of the present disclosure.

BRIEF DESCRIPTION OF THE DRAWINGS

In order to make the aforementioned contents, and other purposes, features, advantages, and embodiments more clear and understandable, with description made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise.

In this document, the term "coupled" may also be termed as "electrically coupled", and the term "connected" may be termed as "electrically connected". "Coupled" and "connected" may also be used to indicate that two or more elements cooperate or interact with each other.

Figure 1:
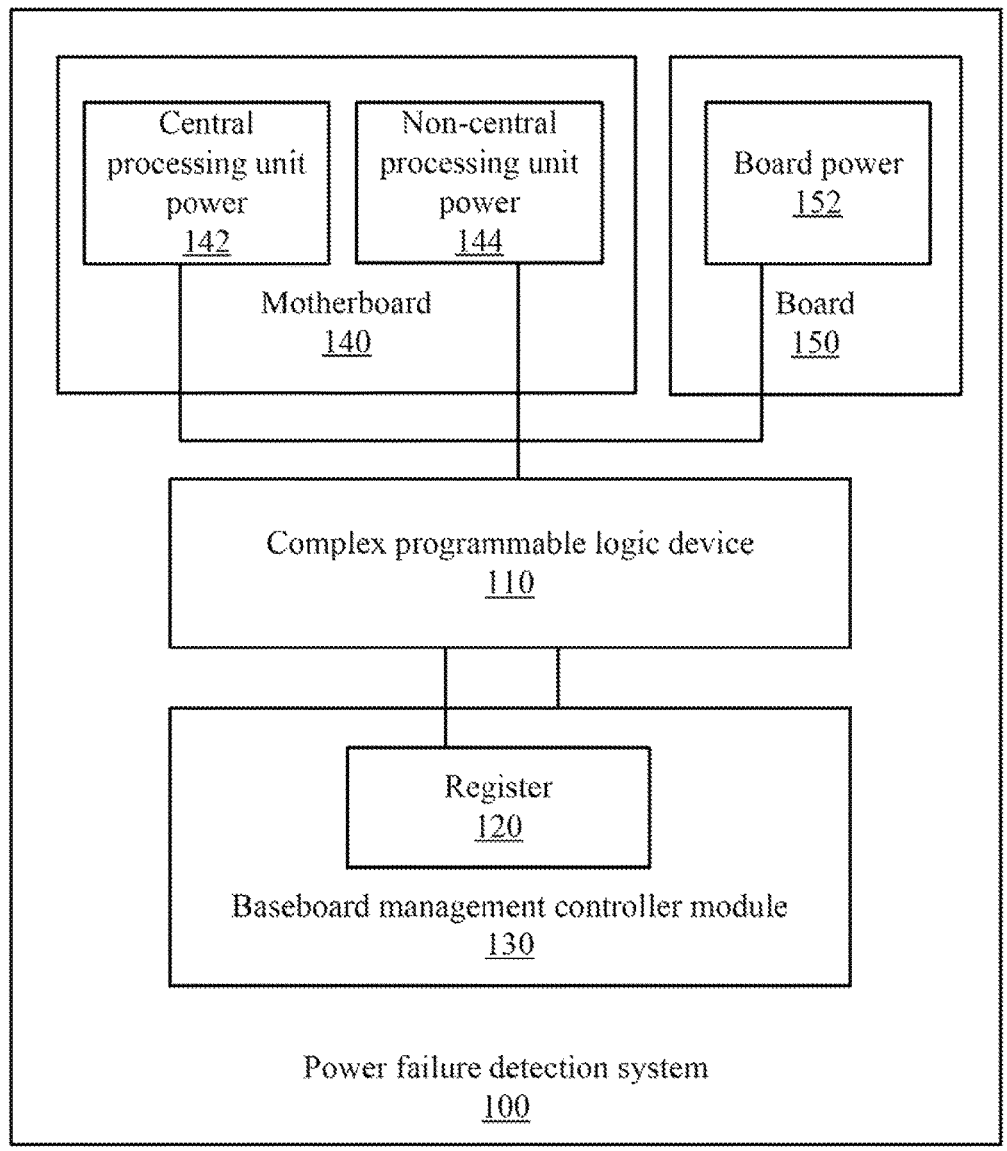
FIG. 1 is a schematic diagram of a power failure detection system according to an embodiment of the present disclosure.

As shown in FIG. 1, FIG. 1 is a schematic diagram of a power failure detection system 100 according to an embodiment of the present disclosure. The power failure detection system 100 includes a motherboard 140, a board 150, a complex programmable logic device (CPLD) 110 and a baseboard management controller (BMC) module 130. The motherboard 140 includes a central processing unit (CPU) power 142 and a non-CPU power 144. The board 150 includes a board power 152. The BMC module 130 includes a register 120. The register 120 is electrically coupled to the CPLD 110.

The CPLD detects operation status of each of powers in a server system in real time. For example, main powers used on the motherboard 140 includes P12V, P5V, P3V3, PVDDQ, PVCCIN, etc, and stand-by powers includes P12V_STBY, P5V_STBY, P3V3_STBY, P1V8_STBY, P1V_STBY, etc. In the present embodiment, powers used on the motherboard can be separated into the CPU power 142 (e.g. PVCCIN) and the non-CPU power 144 (e.g., powers P12V, P5V, P3V3, PVDDQ provided to memory devices of the motherboard and stand-by powers P12V_STBY, P5V_STBY, P3V3_STBY, P1V8_STBY, P1V_STBY). For example, the board power 152 is power provided to a server backboard and includes stand-by powers and main powers.

In one embodiment, the CPLD 110 detects whether a power failure occurs on the CPU power 142, the non-CPU power 144 and the board power 152 in real time. The CPU power 142 and the non-CPU power 144 are provided to the motherboard, and the board power 152 is provided to the board. When the power failure occurs on any of the aforementioned powers, the CPLD 110 executes a shutdown process immediately, and recognizes a power failure type. The CPLD 110 further determine whether to execute a restart process according to the power failure type. If the CPLD 110 executes the restart process and starts up the server system successfully, it indicates that the power failure is a false power fault and repair is not necessary. If the CPLD 110 is unable to start up the server system successfully, the CPLD 110 executes the restart process repeatedly. When a count of the restart process reaches a predetermined count (e.g., the predetermined count is three), a lock information is recorded in the register 120, indicating that the power failure cannot be solved through the restart process. The BMC module 130 is configured to execute a lock process to lock the server system according to the lock information to avoid secondary damage to the server system resulted from false action before the power failure problem is solved. Moreover, the BMC module 130 is also configured to record the count of the restart process. Therefore, the CPLD 110 recognizes a power failure type when the power failure occurs in the server system, and can further determine whether to execute the restart process in order to solve false power fault events, i.e., true power failure event can be checked. The aforementioned predetermined count can be designed based on actual demand and not used to limit the present disclosure. Other appropriate predetermined counts are also within the scope of the present disclosure.

Details of determining whether to execute the restart process according to different power failure types by the CPLD 110 are described as follows. In one embodiment, when the power failure type is a CPU power 142 failure, the CPLD 110 directly records the lock information in the register 120 without executing the restart process. The BMC module 130 executes the lock process to lock the server system according to the lock information, so that the server system is incapable to start up until the CPU power 142 failure is solved. Because the CPU power failure is a fatal power failure, the CPLD 110 directly records the lock information in the register 120 without executing the restart process to the server system. The BMC module 130 is configured to execute the lock process of the server system to avoid secondary damage to the system resulted from false action.

In an alternative embodiment, when the power failure type is a power failure on the motherboard 140 and not the CPU power 142 failure (i.e., non-CPU power 144 failure), the CPLD 110 executes the restart process to try to solve the power failure. If the CPLD 110 starts up the server system successfully, it indicates that the power failure is a false power fault and repair is not necessary. If the CPLD 110 is unable to start up the server system successfully, the CPLD 110 executes the restart process repeatedly. When the count of the restart process reached a predetermined count (e.g., the predetermined count is three), a lock information is recorded in the register 120, indicating that the power failure problem cannot be solved through the restarting. The aforementioned predetermined count can be designed based on actual demand and not used to limit the present disclosure. Other appropriate predetermined counts are also within the scope of the present disclosure.

In an alternative embodiment, when the power failure type is a board power 152 failure (including stand-by powers and main power on the board), the CPLD 110 executes the restart process to try to solve the power failure. If the CPLD 110 starts up the server system successfully, it indicates that the power failure is a false power fault and repair is not necessary. If the CPLD 110 is unable to start up the server system successfully, the CPLD 110 executes the restart process repeatedly. When the count of the restart process reached a predetermined count (e.g., the predetermined count is three), a lock information is recorded in the register 120, indicating that the power failure problem cannot be solved through the restarting. The aforementioned predetermined count can be designed based on actual demand and not used to limit the present disclosure. Other appropriate predetermined counts are also within the scope of the present disclosure. In one embodiment, when the power failure type is the board power 152 failure (including stand-by powers and main power on the board), a notice is shown by a display device. For example, a red light is shown by a light device, but the present disclosure is not limited to the example.

In one embodiment, when the CPLD 110 records the lock information in the register 120, the CPLD 110 sends a position information of the register 120 to the BMC module 130. The BMC module 130 reads the lock information in the register 120 according to the position information in order to execute the lock process.

In one embodiment, the CPLD 110 defines a power scanning process through program codes to record a power failure position where the power failure occurs inside the CPU power 142, the non-CPU power 144 or the board power 152. Therefore, failure analysis and breakdown repair process of the power failure in the server system are improved. For example, when a board power 152 failure occurs, the CPLD 110 is configured to record a certain power on the board where the power failure occurs. Therefore, if the restart process cannot solve the power failure problem, time of checking position of the power failure can be effectively saved. When the CPU power 142 failure occurs, or when the non-CPU power 144 (or the board power 152) failure occurs and the count of the restart process reaches the predetermined count, the CPLD 110 records the lock information in the register 120 that is connected to a pin corresponding to the failed power, and sends the position information of the register 120 to the BMC module 130.

Figure 2:
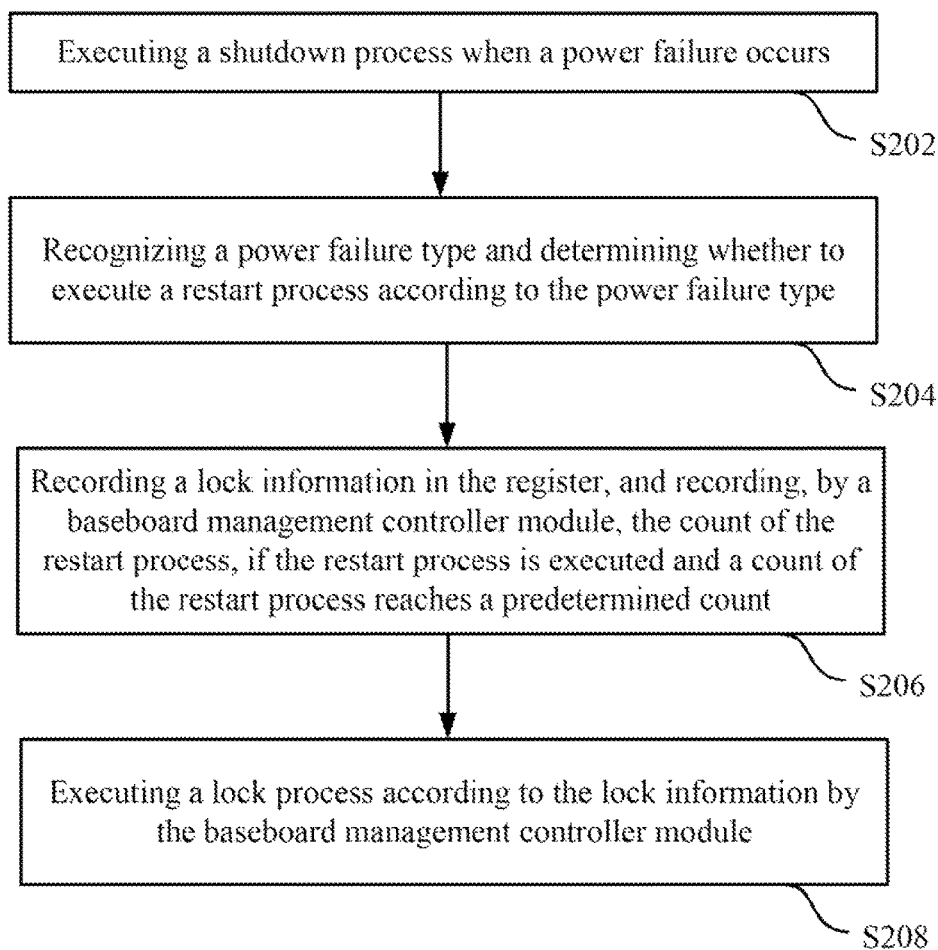
FIG. 2 is a flow chart of a power failure detection method according to an embodiment of the present disclosure.

FIG. 2 is a flow chart of a power failure detection method 200 according to an embodiment of the present disclosure. The power failure detection method 200 includes a plurality of steps S202-S208 and can be implemented by the power failure detection system 100 as shown in FIG. 1. However, those skilled in the art should understand that the sequence of the steps in the present embodiment can be adjusted according to actual needs unless is specified. All or parts of the steps can even be executed simultaneously.

The following description takes powers in a server system for example. Operation status of each of the powers in the server system is detected in real time. For example, main powers used on the motherboard includes P12V, P5V, P3V3, PVDDQ, PVCCIN, etc, and stand-by powers includes P12V_STBY, P5V_STBY, P3V3_STBY, P1V8_STBY, P1V_STBY, etc. In the present embodiment, powers used on the motherboard can be separated into a CPU power (e.g., PVCCIN) and a non-CPU power (e.g., powers P12V, P5V, P3V3, PVDDQ provided to memory devices of the motherboard and stand-by powers P12V_STBY, P5V_STBY, P3V3_STBY, P1V8_STBY, P1V_STBY). For example, a board power is power provided to a server backboard and includes stand-by powers and main powers.

In one embodiment, whether a power failure occurs on the CPU power 142, the non-CPU power 144 and the board power 152 is detected in real time. In step S202, when the power failure occurs on any of the aforementioned powers, a shutdown process is executed immediately. In step S204, a power failure type is recognized and whether to execute a restart process is determined according to the power failure type. If the restart process is executed and the server system is started up successfully, it indicates that the power failure is a false power fault and repair is not necessary. If the server system is unable to be started up successfully, the restart process is executed repeatedly. In step S206, if the restart process is executed and a count of the restart process reaches a predetermined count (e.g., the predetermined count is three), a lock information is recorded in the register 120, indicating that the power failure can not be solved through the restart process. Moreover, the count of the restart process is also recorded by the BMC module. In step S208, by the BMC module, a lock process is executed to lock the server system according to the lock information to avoid secondary damage to the server system resulted from false action before the power failure problem is solved. Therefore, when the power failure occurs in the server system, a power failure type is recognized, and whether to execute the restart process is further determined in order to solve false power fault events, i.e., true power failure event can be checked. The aforementioned predetermined count can be designed based on actual demand and not used to limit the present disclosure. Other appropriate predetermined counts are also within the scope of the present disclosure.

Details of determining whether to execute the restart process according to different power failure types are described as follows. In one embodiment, when the power failure type is a CPU power failure, the lock information is directly recorded in the register without executing the restart process. The lock process is executed to lock the server system according to the lock information by the BMC module, so that the server system is incapable to start up until the CPU power failure is solved. Because the CPU power failure is a fatal power failure, the lock information is directly recorded in the register without executing the restart process to the server system. The lock process of the server system is executed by the BMC module to avoid secondary damage to the system resulted from false action.

In an alternative embodiment, when the power failure type is a power failure on the motherboard and not the CPU power failure (i.e., non-CPU power failure), the restart process is executed to try to solve the power failure. If the server system is started up successfully, it indicates that the power failure is a false power fault and repair is not necessary. If the server system is unable to be started up successfully, the restart process is executed repeatedly. When the count of the restart process reached a predetermined count (e.g., the predetermined count is three), a lock information is recorded in the register 120, indicating that the power failure problem cannot be solved through the restarting. The aforementioned predetermined count can be designed based on actual demand and not used to limit the present disclosure. Other appropriate predetermined counts are also within the scope of the present disclosure.

In an alternative embodiment, when the power failure type is a board power failure (including stand-by powers and main power on the board), the restart process is executed to try to solve the power failure. If the server system is started up successfully, it indicates that the power failure is a false power fault and repair is not necessary. If the server system is unable to be started up successfully, the restart process is executed repeatedly. When the count of the restart process reached a predetermined count (e.g., the predetermined count is three), a lock information is recorded in the register 120, indicating that the power failure problem cannot be solved through the restarting. The aforementioned predetermined count can be designed based on actual demand and not used to limit the present disclosure. Other appropriate predetermined counts are also within the scope of the present disclosure. In one embodiment, when the power failure type is the board power failure (including stand-by powers and main power on the board), a notice is shown by a display device. For example, an alarm light is shown by a light device, but the present disclosure is not limited to the example.

In one embodiment, when the lock information is recorded in the register, a position information of the register is sent to the BMC module. The BMC module reads the lock information in the register according to the position information in order to execute the lock process.

In one embodiment, a power scanning process is defined through program codes to record a power failure position where the power failure occurs inside the CPU power, the non-CPU power or the board power. Therefore, failure analysis and breakdown repair process of the power failure in the server system are improved. For example, when a board power failure occurs, a certain power on the board where the power failure occurs is recorded. Therefore, if the restart process cannot solve the power failure problem, time of checking position of the power failure can be effectively saved. When the CPU power failure occurs, or when the non-CPU power (or the board power) failure occurs and the count of the restart process reaches the predetermined count, the lock information is recorded in the register that is connected to a pin corresponding to the failed power, and the position information of the register is sent to the BMC module.

In sum, through the aforementioned embodiments, the present disclosure can recognize a power in a server system where a power failure occurs without measuring power-on sequence of powers in turn. A correspondingly subsequent process is executed according to the aforementioned power failure type to solve false power fault event, i.e., a true power failure can be checked. Repair cost resulted from the false power fault can be further reduced. In the other hand, if the power failure cannot be solved through the restart process, failure analysis and breakdown repair process of the power failure in the server system can be improved by related information of the power failure.

Even though the present disclosure is disclosed as above, the disclosure is not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. A power failure detection system, comprising:
    a motherboard, comprising:
        a central processing unit power; and
        a non-central processing unit power;
    a board, comprising a board power;
    a complex programmable logic device, configured to execute a shutdown process when a power failure occurs, recognize a power failure type, and determine whether to execute a restart process according to the power failure type, wherein the power failure type indicates that the power failure occurs on the central processing unit power, the non-central processing unit power or the board power; and
    a baseboard management controller module, comprising:
        a register, electrically coupled to the complex programmable logic device,
    wherein, if the complex programmable logic device executes the restart process and a count of the restart process reaches a predetermined count, the complex programmable logic device records a lock information in the register; and the baseboard management controller module is configured to record the count of the restart process and executes a lock process according to the lock information.

2. The power failure detection system of claim 1, wherein, when the complex programmable logic device records the lock information the register, the complex programmable logic device sends a position information of the register to the baseboard manage rent controller module; and the baseboard management controller module reads the lock information in the register according to the position information.

3. The power failure detection system of claim 1, wherein, when the power failure type indicates that the power failure occurs on the central processing unit power, the complex programmable logic device records the lock information in the register.

4. The power failure detection system of claim 1, wherein, when the power failure type indicates that the power failure occurs on the board power or the non-central processing unit power, the complex programmable logic device executes the restart process.

5. The power failure detection system of claim 1, wherein the complex programmable logic device is configured to record that the power failure occurs on a power failure position inside the central processing unit power, the non-central processing unit power or the board power through a power scanning process.

6. A power failure detection method, comprising:
    executing a shutdown process when a power failure occurs;
    recognizing a power failure type and determining whether to execute a restart process according to the power failure type, wherein the power failure type indicates that the power failure occurs on a central processing unit power, a non-central processing unit power or a board power;
    recording a lock information in the register, and recording, by a baseboard management control er module, the count of the restart process, if the restart process is executed and a count of the restart process reaches a predetermined count; and
    executing a lock process according to the lock information by the baseboard management controller module.

7. The power failure detection method of claim 6, further comprising:
    sending a position information of the register to the baseboard management controller module when the lock information is recorded in the register, wherein the baseboard management controller module reads the lock information in the register according to the position information.

8. The power failure detection method of claim 6, further comprising:
    recording the lock information in the register when the power failure type indicates that the power failure occurs on the central processing unit power.

9. The power failure detection method of claim 6, further comprising:
    executing the restart process when the power failure type indicates that the power failure occurs on the board power or the non-central processing unit power.

10. The power failure detection method of claim 6, further comprising:
    recording a power failure position where the power failure occurs inside the central processing unit power, the non-central processing unit power or the board power through a power scanning process.

* * * * *